United States Patent [19]

Wolf et al.

[11] 3,862,088

[45] Jan. 21, 1975

[54] SOLUBLE AROMATIC COPOLYAMIDES AND THREADS THEREOF WITH A HIGH MODULUS OF ELASTICITY AND HIGH TENSILE STRENGTH

[75] Inventors: Gerhard Dieter Wolf; Hans Egon Künzel, both of Dormagen; Günter Blankenstein, Stommeln; Francis Bentz, Cologne, all of Germany

[73] Assignee: Bayer Aktiengesellschaft, Leverkusen, Germany

[22] Filed: Oct. 4, 1973

[21] Appl. No.: 403,389

[30] Foreign Application Priority Data

Oct. 4, 1972 Germany............................ 2248662

[52] U.S. Cl........ 260/47 CZ, 260/30.2, 260/30.6 R, 260/30.8 R, 260/30.8 D, 260/32.4, 260/32.6 N, 260/49, 260/63 R, 260/65, 260/78 A, 260/78 R, 260/857 R

[51] Int. Cl............................................. C08g 20/20

[58] Field of Search ..... 260/47 CZ, 78 R, 49, 78 A, 260/63 R, 857 R, 65

[56] References Cited
UNITED STATES PATENTS 3,671,614   6/1972   Kunzel et al.................... 260/47 CZ Primary Examiner—Lester L. Lee
Attorney, Agent, or Firm—Plumley & Tyner

[57] ABSTRACT

The invention relates to copolyamides which have an extremely low water absorption capacity of 1 to 3.5 % but remarkably high tensile strengths of between 7 and 20 g/dtex and moduli of elasticity of between 500 and 11.000 kg.wt/mm². The copolyamides comprise of from 50 to 95 mol.% of structural units of the general formula

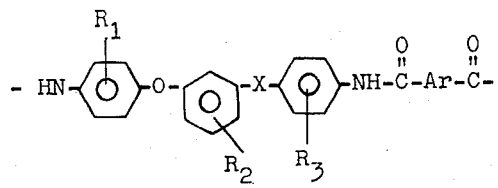

and 5 to 50 mol% of structural units containing hydantoin rings and having the general formula

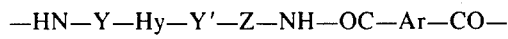

wherein X, $R_1$, $R_2$, $R_3$, $R_4$, $R_5$, $R_6$, $R_7$, Ar, Z, Y, Y' and Hy have the meaning described in the following specification.

8 Claims, No Drawings

SOLUBLE AROMATIC COPOLYAMIDES AND THREADS THEREOF WITH A HIGH MODULUS OF ELASTICITY AND HIGH TENSILE STRENGTH

This invention relates to aromatic copolyamides which contain hydantoin rings and to threads and fibres with very high tensile strengths and high moduli of elasticity produced from them.

Threads and fibres which have a high modulus of elasticity are already known. They are mainly polycondensates of p-aminobenzoyl chloride hydrochloride (German Offenlegungsschrift No. 1,924,736) and of p-aminobenzhydrazide and terephthalic acid dichloride (German Offenlegungsschrift No. 1,938,282). Fibres of these polycondensates have a very high modulus of elasticity which, in some cases, exceeds that of glass fibres. Compared with glass fibres, these fibres have the advantage of having a lower density; the specific modulus of elasticity of these fibres is therefore substantially higher than that of glass fibres. A disadvantage of these polycondensates, however, is that they are difficult to dissolve. To prepare solutions in polar organic solvents it is necessary to add considerable quantities of inorganic salts (lithium chloride) to the solvents, and these salts must subsequently be removed from the finished threads in time-consuming after-treatment processes because they reduce the resistance of the polycondensates to elevated temperatures.

Other threads and fibres with moduli of elasticity have become known which consist of high molecular weight aromatic polyamides which are soluble in polar organic solvents and which contain recurrent structural units of the general formula I

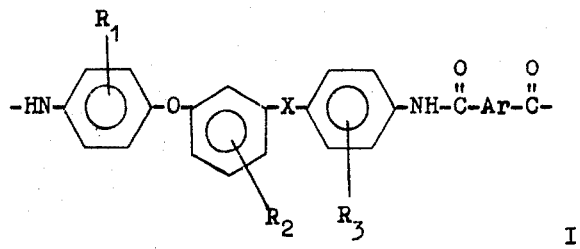

in which
X represents the group

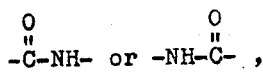

$R_1$ and $R_2$ represent, independently of each other, hydrogen, $C_1-C_4$ alkoxy or alkyl groups or halogen atoms, $R_3$ represents hydrogen, halogen, a $C_1-C_4$ alkyl or alkoxy group, a nitrile group, a $COOR_4$ group or a $-CONR_5R_6-$group, and Ar represents a divalent aromatic group, $R_4$ representing hydrogen or a $C_1-C_4$ alkyl group and $R_5$ and $R_6$ representing, independently of each other, hydrogen or $C_1-C_4-$ alkyl groups or aryl groups.

Threads produced from polycondensates of formula I were found to have tensile strengths of 5–10 g/dtex and moduli of elasticity of between 4000 and 10,000 kg.wt./mm².

Polyamides which contain hydantoin rings are also known (see German Offenlegungsschriften Nos. 1,720,687 and 1,720,733). They have the recurrent structural unit of the general formula

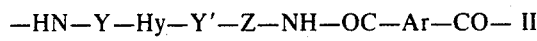

in which
Z denotes a single bond or the group $-Hy-Y-$ and
Y and Y' may be the same or different and represent bivalent aromatic groups which consist of one or more condensed or of several aromatic rings joined together by single bonds or by bridge members such as

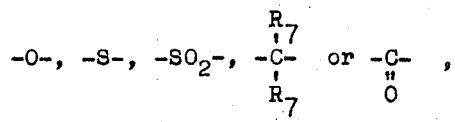

or they represent the halogen, $C_1-C_4$ alkyl, $NO_2-$ or $CN-$ substitution products of such groups, Hy represents a bivalent hydantoin ring of the formula

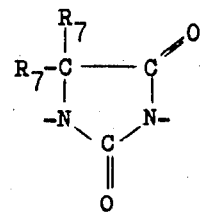

in which
$R_7$ represents hydrogen, a $C_1-C_4$ alkyl group, a cycloalkyl group or a phenyl group which may be substituted and Ar represents a bivalent aromatic group which consists of one or more condensed or several aromatic rings which are joined together by single bonds or by bridge members such as

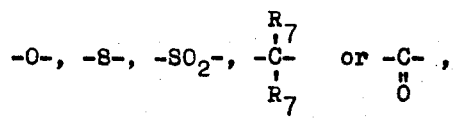

and the halogen, $C_1-C_4$ alkyl, $NO_2-$ or CN substitution products thereof.

Threads and fibres produced from these polyamides have tensile strengths of between 2 and 4.5 g/dtex and moduli of elasticity of around 1000 kg.wt./mm². The water absorption capacity of these fibres is between 5 and 11 % (determined at 20°C and 65 % relative humidity), depending on the structure of the polyamide.

If copolyamides are prepared from the diamines on which the homopolycondensates I and II are based, the properties of the individual homopolycondensates would lead one to expect that the corresponding copolyamide would have a relatively high water absorption capacity and relatively low tensile strengths and moduli of elasticity due to the loosening up of the structure. It was surprisingly found, however, that exactly the opposite is the case. Copolyamides produced in this way have an extremely low water absorption capacity of 1 to 3.5 % but remarkably high tensile strengths of between 7 and 20 g/dtex and moduli of elasticity of between 500 and 11,000 kg.wt./mm².

More particularly, this invention relates to a high-molecular weight aromatic copolyamide which comprises from 50 to 95 mols-% of structural units of the general formula I

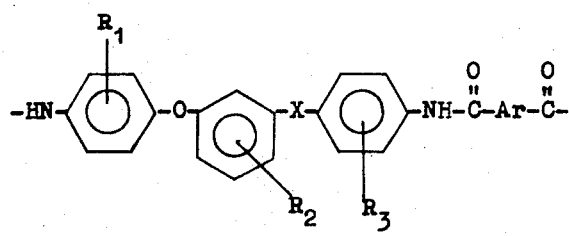

in which
X represents the group

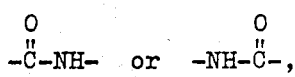

R₁ and R₂, which may be the same or different, represent hydrogen, an alkoxy group, an alkyl group or a halogen atom,
R₃ represents hydrogen halogen, an alkyl, an alkoxy group, a nitrile group, a COOR₄— or —CONR₅-R₆—group and
Ar represents a divalent aromatic group,
R₄ denoting hydrogen or an alkyl group and
R₅ and R₆, which may be the same or different, representing hydrogen, an alkyl group or aryl group
and 5–50 mols-% of structural units which contain hydantoin rings, which structural units are represented by the general formula —HN—Y—Hy—Y′—Z—NH—OC—Ar—CO—   II in which
Z represents a single bond or the group —Hy—Y— and
Y and Y′ may be the same or different and represent bivalent aromatic groups which comprise one or more condensed or several aromatic rings which are joined together by single bonds or by bridge members and the halogen-, alkyl-, NO₂— or CN-substitution products of such groups,
Hy represents a bivalent hydantoin ring of the formula

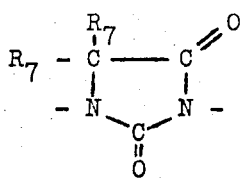

in which
R₇ represents hydrogen, alkyl, cycloalkyl, a phenyl group or a substituted phenyl group and
Ar represents a bivalent aromatic group,
the copolyamides having a relative solution viscosity (determined on a 0.5 % solution of the copolyamide in concentrated sulphuric acid at 25°C) of 1.5 to 3.

In cases where R₁, R₂ or R₃ represent halogen, the halogen is preferably chlorine. If R₅ and R₆ represent aryl groups, they are preferably phenyl or phenyl groups substituted with chlorine or C₁–C₄ alkyl groups.

The copolyamides according to the invention are therefore built up of 3 components:

1. The first component consists of one or more fully aromatic diamines corresponding to the general formula

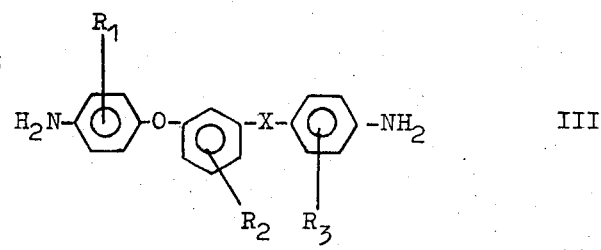

in which
R₁, R₂, R₃ and X have the meanings defined above.
The following compounds are given as examples:

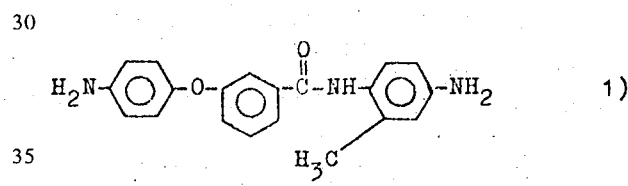

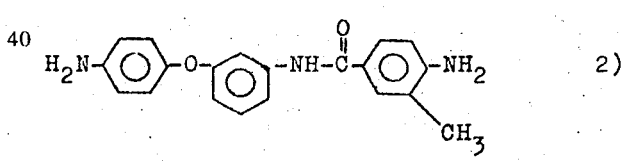

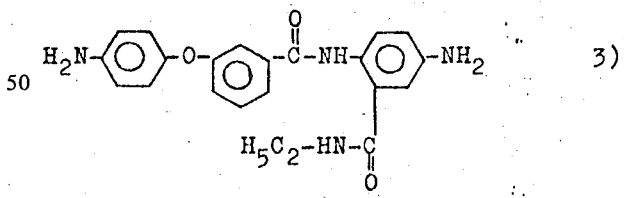

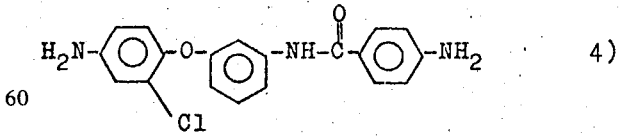

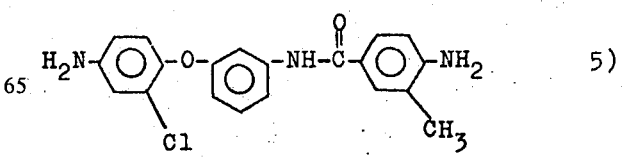

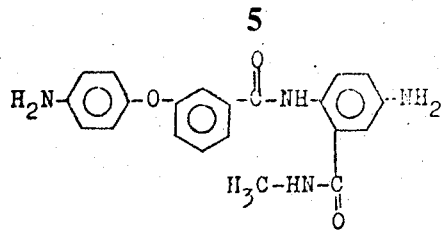 6)

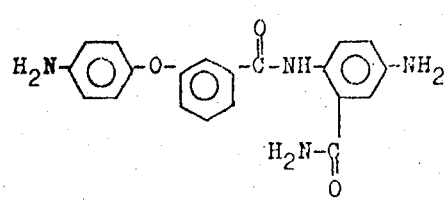 7)

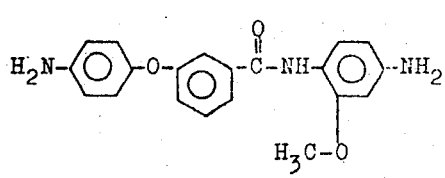 8)

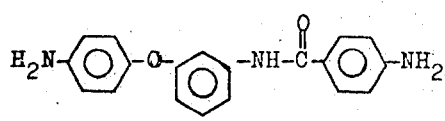 9)

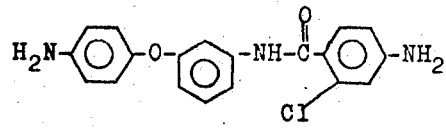 10)

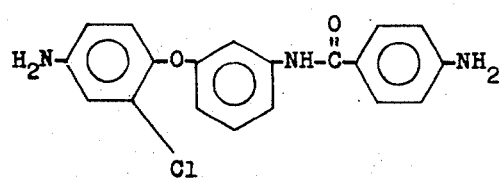 11)

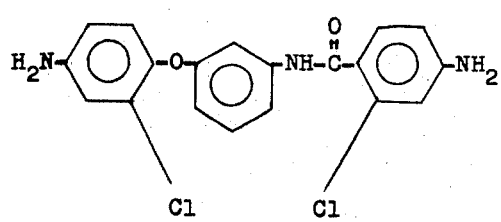 12)

These diamines may be prepared according to known processes, for example by reacting 3-(4'-nitrophenoxy)-benzoic acid chloride with the corresponding substituted or unsubstituted 4-nitroaniline and reducing the resulting dinitro compound or by reacting a substituted or unsubstituted 3-amino-4'-nitrodiphenylether with 4-nitrobenzoyl chloride or substituted 4-nitrobenzoyl chloride and then reducing the resulting dinitro compounds. These dinitro compounds can be obtained from substituted or unsubstituted 4-nitrophenoxybenzoic acid and substituted or unsubstituted 4-nitroaniline or from the aminonitrodiphenylethers and substituted or unsubstituted 4-nitrobenzoic acid in N-methyl pyrrolidone in the presence of $P_2O_5$.

The second component consists of one or more diamines corresponding to the general formula $$H_2N-Y-Hy-Y'-Z-NH_2 \qquad IV$$

in which

Z, Y, Y' and Hy have the meanings defined above.
The following diamines are given as examples:

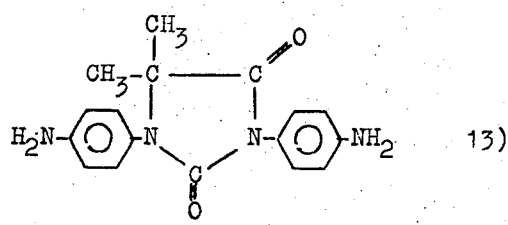 13)

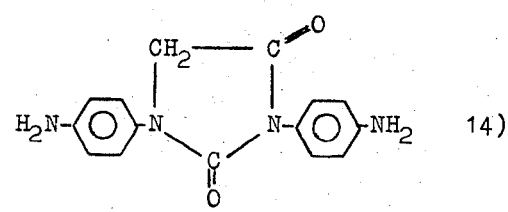 14)

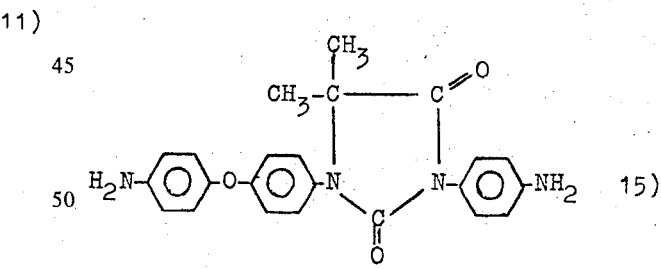 15)

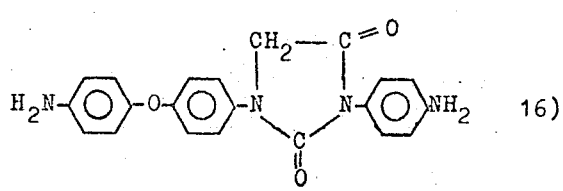 16)

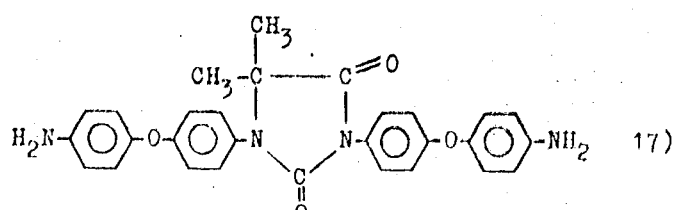 17)

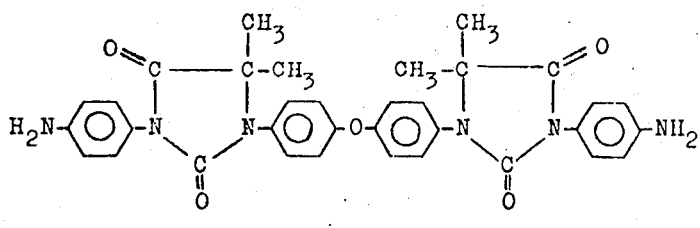
18)

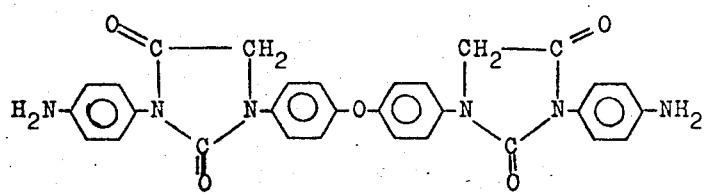
19)

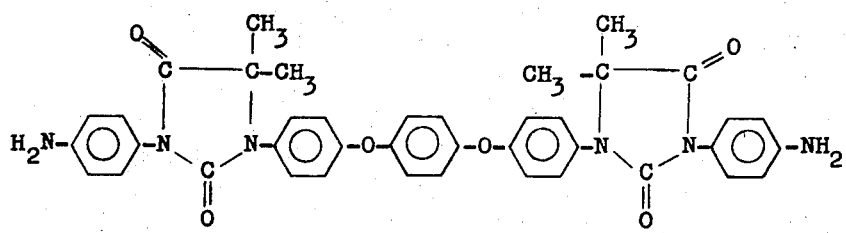
20)

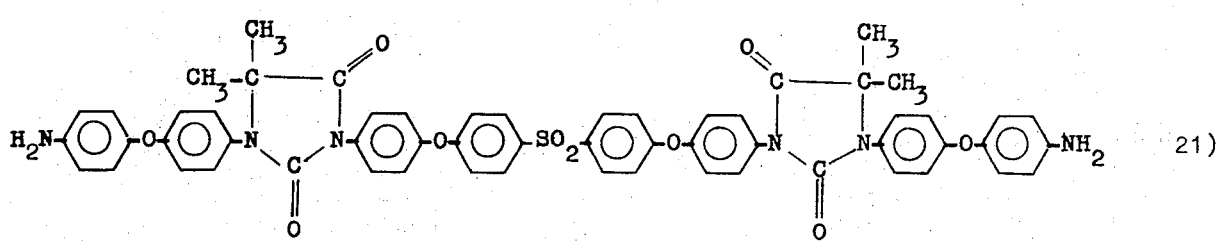
21)

These diamines are added in proportions of 5 to 50 mols-%, preferably 10 to 30 mols-%, based on the total quantity of diamines used, in order to obtain threads and fibres with tensile strengths and moduli of elasticity.

These diamines which contain hydantoin rings may, for example, be prepared as described in German Offenlegungsschrift 1,720,687 and German Offenlegungsschrift 1,720,733. Aromatic diamines which contain a hydantoin ring can be obtained by reacting N-substituted ε-aminoacid nitriles or esters with aromatic isocyanates in a molar ratio of 1:1 in inert solvents and cyclising the resulting ureas to hydantoin derivatives, followed by reduction of the nitro groups.

When preparing these diamines, both the N-substituted α-aminocarboxylic acid nitriles or esters and the aromatic isocyanates may contain a nitro group right from the start or one or both nitro groups may be introduced by nitrating the hydantoin derivatives.

Suitable aromatic diamines in which two hydantoin rings separated by aromatic groups are situated between the two aromatic amino groups are, for example, those diamines which can be prepared in known manner by reacting a nitro-containing N-substituted α-aminocarboxylic acid nitrile or ester of the following formula

with aromatic diisocyanates of the formula

OCN—Y'—NCO in which
Y, Y' and $R_7$ have the meanings defined above and
$R_8$ denotes $C_1$–$C_4$ alkyl groups in a molar ratio of 2:1 in inert solvents and cyclising the resulting ureas to hydantoin derivatives and then reducing the nitro groups.

These diamines may also be obtained by a similar reaction by reacting aromatic isocyanates which contain a nitro group in accordance with the following formula $O_2N$—Y—NCO with aromatic compounds which contain two α-aminocarboxylic acid nitrile groups or two α-aminocarboxylic acid ester groups in accordance with the following formula

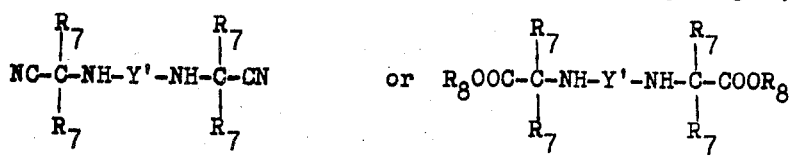

in which

Y, Y′, $R_7$ and $R_8$ have the meanings defined above in a molar ratio of 2:1, followed by ring closure and reduction of the nitro groups.

The third component consists of aromatic dicarboxylic acid dihalides of the general formula Hal—OC—Ar—CO—Hal    V in which Hal denotes Cl or Br and Ar has the meaning indicated above.

The following are given as examples:

Isophthalic acid dichloride, terephthalic acid dichloride, diphenyl-carboxylic acid-4,4′-dichloride, naphthalene-dicarboxylic acid-1,5-dichloride, naphthalene-dicarboxylic acid-2,6-dichloride, diphenylether-dicarboxylic acid 4,4′-dichloride, diphenylsulphone-dicarboxylic acid-4,4′-dichloride, benzophenone-dicarboxylic acid-4,4′-dichloride and the corresponding dibromides as well as alkyl- and halogen-substitution products of the above mentioned acid dihalides.

Terephthalic acid dichloride has been found to be particularly suitable for this invention.

Polycondensation of the 3 components described above is carried out by known processes such as interface polycondensation but preferably by a process of solution polycondensation in polar organic solvents such as N,N-dialkylcarboxylic acid diamines, preferably N,N-dimethylacetamide, or N-alkyl-substituted lactams, preferably N-methyl pyrrolidone, or in tetramethyl urea or hexamethyl phosphoric acid triamide etc. or in mixtures of such polar aprotic solvents in the absence of additional acid acceptors but optionally in the presence of solubilising agents such as alkali metal or alkaline earth metal halides if they are necessary to keep the copolyamides in solution. Condensation is carried out at a temperature of between —30° and 150°C, preferably between —10° and 30°C. The reaction times may be between 1 and 30 hours. The solids content of the solutions is from 5 to 40 %, preferably 10 to 25 %. In order to obtain reaction products with the highest possible molecular weight, it is advisable to use the sum of diamines and dicarboxylic acid dichloride components in equimolar quantities although the polycondensation may in principle also be carried out with an excess or less than equivalent amount of dicarboxylic acid dichloride. The dicarboxylic acid dichloride may be added to the solution or suspension of diamines in solvent in several small portions spread over a considerable period of time but in some cases it is advisable to add the total quantity of dicarboxylic acid dichloride all at once and preferably with cooling.

The polyamides may either be spun directly from the polycondensation solution, optionally after first neutralising the hydrochloric acid, e.g. with ethylene oxide, propylene oxide or amines, or the polyamides may be processed into threads or fibres after they have been precipitated from the polycondensation solution with precipitating agents such as water, alcohols or ketones, dried and dissolved in the given polar solvents or in dialkyl sulphoxides such as dimethyl sulphoxide.

Spinning may in principle be carried out by the usual methods of dry or wet spinning. The polyamides are preferably spun from solutions in dimethyl acetamide or N-methyl pyrrolidone which have polyamide solids contents of between 12 and 25 %. The viscosities of the spinning solutions are preferably between 500 and 1100 Poises (determined at 20°C in a rotation viscosimeter) although solutions with viscosities of up to 2500 Poises can be spun without difficulty. The relative viscosity of the polyamides was between $\eta_{rel.} = 1.5$ and $\eta_{rel.} = 3$, preferably between 1.8 and 2.5 (determined on a 0.5 % solution in concentrated sulphuric acid at 25°C).

In the wet spinning process, the threads were coagulated in an aqueous precipitation bath at 50°–60°C and drawn off from a 10-aperture die (aperture diameter 0.1 mm) at a rate of 10–20 metres per minute. In the dry spinning process, the threads were extruded through the die (aperture diameter 0.1 mm) into a spinning shaft charged with hot air at about 200°C and drawn off at the rate of 100 metres per minute.

The after-treatment is very important for producing threads with good textile properties. Both wet spun and dry spun threads are preferably first prestretched in boiling water to a ratio of between 1:1.2 and 1:1.7 and then washed in water at 60°C and dried. The final stretching to a ratio of 1:6–1:12 is carried out at a temperature of 420° to 500°C.

The tensile strengths of the stretched threads were between 7 and 20 g/dtex at 1–3 % elongation. The moduli of elasticity were found to be between 5000 and 11,000 kg.wt./mm².

The following Examples are to further illustrate the invention without limiting it.

EXAMPLE 1

143.5 parts by weight of 4-amino-3′-(p-aminophenoxy)-benzanilide of the formula

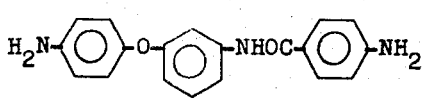

and 15.5 parts by weight of 1,3-bis-(p-aminophenyl)-5,5-dimethyl-hydantoin (10 mols-% based on the total quantity of diamine) were dissolved in 780 parts by weight of anhydrous dimethyl acetamide. 101.5 parts by weight of terephthalic acid dichloride were added in 3 portions over a period of about 2 hours at room temperature. When all the terephthalic acid dichloride had been added, the reaction mixture was diluted with 600 parts by weight of dimethylacetamide and stirred at room temperature for 6 hours. 58 parts by weight of propylene oxide were then added dropwise to neutralise the hydrochloric acid formed. The neutral solution had a viscosity of 1050 Poises at 20°C. The relative viscosity of the polymer, determined on a 0.5 % solution in concentrated sulphuric acid of a sample of polyamide which had been precipitated with water and dried at 120°C was 2.54. The polyamide solution was spun into a water bath at 20°C at a draw-off rate of 10 metres per minute. The threads were first prestretched in boiling water in the ratio of 1:1.3 and after drying they were finally stretched in the ratio of 1:7 on a roller at temperatures of between 440° and 460°C.

The threads were found to have the following properties:

| | |
|---|---|
| Tensile strength: | 13–16 g/dtex |
| Elongation on tearing: | 2% |
| Modulus of elasticity: | 8630 ± 730 kg.wt./mm² |

The values for the elastic modulus are average values obtained from five measurements.
Moisture absorption: 1.7%

To determine the moisture absorption capacity, the fibres are washed at 300°C, dried and exposed to an atmosphere of 20°C and 65 % relative humidity for 24 hours to enable them to absorb moisture. The fibres are then dried in a vacuum at 80°C and the moisture absorption is given as the absorption at equilibrium in % by weight of the absolutely dry fibre.

EXAMPLE 2

239 parts by weight of 4-amino-3'-(p-aminophenoxy)-benzanilide and 77.5 parts by weight of 1,3-bis(p-aminophenyl)-5,5-dimethylhydantoin (25 mols-% based on the total quantity of diamine) were dissolved in 1530 parts by weight of anhydrous N-methyl pyrrolidone, and 203 parts by weight of terephthalic acid dichloride were added portionwise at room temperature. A highly viscous solution was formed which was gradually diluted with a further 1450 parts by weight of N-methyl pyrrolidone. After a further 6 hours stirring at room temperature, 116 parts by weight of propylene oxide were added to neutralise the hydrochloric acid formed. The neutral solution had a viscosity of 940 Poises. The solids content was approximately 13 %. This solution was spun wet and the resulting threads were first prestretched in boiling water in the ratio of 1:1.3 and dried and then stretched in the ratio of 1:6 on a roller at temperatures of between 440° and 460°C. $\eta_{rel.}$ = 2.09 (determined on a 0.5% solution in concentrated sulphuric acid.).

The threads were found to have the following properties:

| | |
|---|---|
| Tensile strength: | 12–14 g/dtex |
| Elongation on tearing: | 2–3 % |
| Modulus of elasticity: | 8100 ± 940 kg.wt./mm² |
| Moisture absorption: | 2.1 % |

EXAMPLE 3

100 parts by weight of 4-amino-3-methyl-3'(2''-chloro-4''-aminophenoxy)-benzanilide of the formula

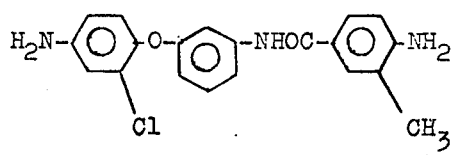

and 10.3 parts by weight of 1,3-bis-(p-aminophenyl)-5,5-dimethyl-hydantoin (approximately 11 mols-%, based on the total quantity of diamine) were dissolved in 520 parts by weight of N-methyl pyrrolidone and polycondensed with 62.2 parts by weight of terephthalic acid dichloride.

As described in detail in Example 1, the reaction mixture was diluted, neutralised and spun wet. The threads were stretched in the ratio of 1:8–10 at 450° to 460°C.
Properties of the threads:

| | |
|---|---|
| Tensile strength: | 9–11 g/dtex |
| Elongation on tearing: | 1.5 % |
| Modulus of elasticity: | 7800 ± 820 kg.wt./mm² |
| Water absorption capacity: | 1.8 % |

EXAMPLE 4

282 parts by weight of 4-amino-3'-(2''-chloro-4''-amino-phenoxy)-benzanilide of the formula

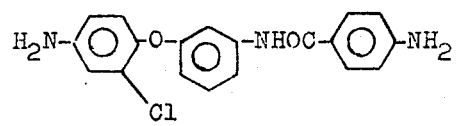

and 62 parts by weight of 1,3-bis-(p-aminophenyl)-5,5-dimethyl-hydantoin were polycondensed with 203 parts by weight of terephthalic acid dichloride as described in Example 1. The diluted solution neutralised with propylene oxide was spun wet. The resulting threads were stretched in the ratio 1:9–10 at about 450°C.

The threads were found to have the following properties:

| | |
|---|---|
| Tensile strength: | 11–14 g/dtex |
| Elongation on tearing: | 1.5 – 2 % |
| Modulus of elasticity: | 9100 ± 800 kg.wt./mm² |
| Moisture absorption: | 2.0 % |

We claim:
1. A high molecular weight aromatic copolyamide which consists essentially of from 50 to 95 mol -% of structural units of the general formula

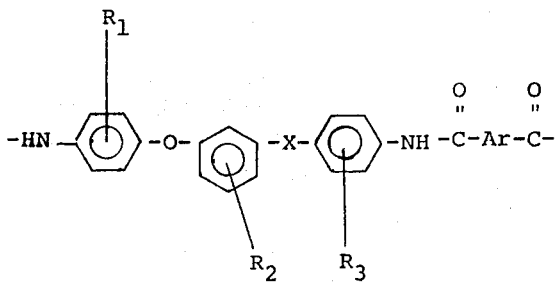

in which
X represents the group

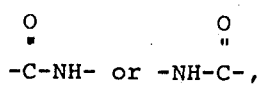

$R_1$ and $R_2$, which may be the same or different, represent hydrogen, an alkoxy group, an alkyl group or a halogen atom,
$R_3$ represents hydrogen, halogen, an alkyl, an alkoxy group, a nitrile group, a $COOR_4$ or $-CONR_5R_6$ group and
Ar represents a divalent aromatic group,
$R_4$ denoting hydrogen or an alkyl group and
$R_5$ and $R_6$, which may be the same or different, representing hydrogen, an alkyl group or aryl group and 5-50 mol -% of structural units which contain hydantoin rings, which structural units are represented by the general formula

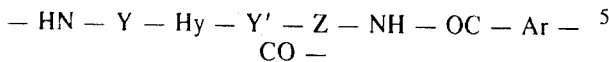

in which
Z represents a single bond or the group — Hy — Y — and
Y and Y' may be the same or different and represent bivalent aromatic groups which comprise one or more condensed or several aromatic rings which are joined together by single bonds or by bridge members selected from the group consisting of —O—, —S—, —SO$_2$—,

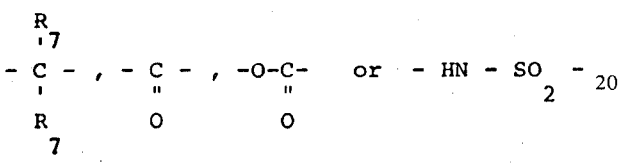

and the halogen-; alkyl-, NO$_2$ - or CN-substitution products of such aromatic groups
Hy represents a bivalent hydantoin ring of the formula

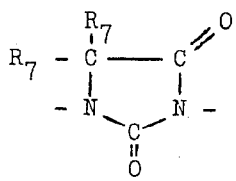

in which
R$_7$ represents hydrogen, alkyl, cycloalkyl, a phenyl group

Ar represents a bivalent aromatic group wherein the copolyamides have a relative solution viscosity as determined on an 0.5% solution of the copolyamide in concentrated sulphuric acid at 25°C of from 1.5 to 3.0.

2. The copolyamide as claimed in claim 1 in which, in the general formula I, one or more of R$_1$ and R$_2$ and R$_3$ represent a C$_1$ to C$_4$ alkyl or an alkoxy group.

3. The copolyamide as claimed in claim 1 in which, in the general formula I of claim 1, one or more of R$_4$ and R$_5$ and R$_6$ represent a C$_1$ to C$_4$ alkyl group.

4. The copolyamide as claimed in claim 1 in which, in the general formuala II of claim 1, Y, Y', or both represents a bivalent aromatic group which comprises several aromatic rings joined together by —O—, —S—, —SO$_2$—,

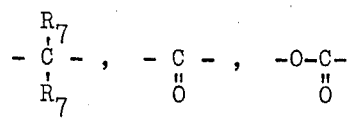

or — HN — SO$_2$ — groups.

5. The copolyamide as claimed in claim 1 in which, in the general formula II of claim 1, R$_7$ represents a C$_1$ to C$_4$ alkyl group.

6. The copolyamide as claimed in claim 1 in which, in the general formula I of claim 1, one or more of R$_1$ and R$_2$ and R$_3$ represents chlorine.

7. The copolyamide as claimed in claim 1 in which, in the general formula I, R$_5$, R$_6$ or both represents a phenyl group, or a phenyl group substituted with chlorine or a C$_1$ to C$_4$ alkyl group.

8. The copolyamide as claimed in claim 1, which comprises from 70 to 90 mols-% of structural units of the general formula I and from 30 to 10 mols-% of structural units of the general formula II.

* * * * *